3,053,899
PREPARATION OF SYMMETRICAL DIALKYLDIBORANES

Irvine J. Solomon, Morton J. Klein, and Kiyoshi Hattori, all % Callery Chemical Co., 9600 Perry Highway, Chicago 37, Ill.
No Drawing. Filed Apr. 17, 1959, Ser. No. 806,997
6 Claims. (Cl. 260—606.5)

This invention relates to a method of preparing sym-dialkyldiboranes, $R_2B_2H_4$, and more particularly to their preparation from mixtures of alkyldiboranes.

The alkyldiboranes are best considered as combinations of the following borane fragments: borane, $BH_3$; alkylborane, $RBH_2$; and dialkylborane, $R_2BH$. Thus monoalkyldiborane $RB_2H_5$ is considered a combination of $RBH_2$ and $BH_3$; sym-dialkyldiborane a combination of two $RBH_2$ groups; unsym-dialkyldiborane a combination of $R_2BH$ and $BH_3$; trialkyldiborane a combination of $RBH_2$ and $R_2BH$; and tetraalkyldiborane a combination of two $R_2BH$ groups. The alkyldiboranes are useful as chemical intermediates in preparing other compounds containing boron-carbon bonds. The sym-dialkyldiboranes are particularly desirable for the preparation of compounds containing only one boron-carbon bond. For example, boronic acid can be prepared by the hydrolysis of sym-dialkylborane according to the equation $$\text{sym-}R_2B_2H_4 + 2H_2O \rightarrow 2RB(OH)_2 + 2H_3$$

If alkyldiboranes containing a $R_2BH$ group are used, compounds with two boron-carbon bonds are also formed. If compounds with a $BH_3$ group are used, there is a consumption of relatively expensive boron-hydrogen material with no formation of boron-carbon compounds.

It is therefore an object of this invention to provide a method of preparing sym-dialkyldiboranes. Other objects will become apparent from the following description and claims.

The mixtures of alkyldiboranes prepared by prior art methods contain all the alkyldiborane species, and the sym-dialkyldiborane cannot easily be separated from these mixtures since its physical properties are very similar to unsym-dialkyldiboranes.

We have discovered that mixed alkyldiboranes can be converted to exclusively sym-dialkyldiboranes by treating the mixture with diborane to form monoalkyldiboranes and disproportionating the monoalkyldiborane to form sym-dialkyldiborane.

According to this invention, mixtures of alkyldiboranes are contacted with excess diborane to enrich the mixture of monoalkyldiborane according to the overall equation $$R_xB_2H_{6-x} + XB_2H_6 \rightarrow XRB_2H_5$$

The monoalkyldiborane is more volatile than the other alkyldiboranes and is separated by distillation, gas stripping or other similar methods. The separated monoalkyldiborane is then disproportionated according to $$2RB_2H_5 \rightleftharpoons \text{sym-}R_2B_2H_4 + B_2H_6$$

Sym-dialkyldiborane is much less volatile than diborane and monoalkyldiborane, and is therefore easily separated by distillation or stripping methods. The sym-dialkyldiborane thus separated is unexpectedly stable, and does not disproportionate into the other alkyldiborane species containing $R_2BH$ groups. The separated diborane may be recycled for use in treating additional mixed alkyldiboranes.

The proportion of monoalkyldiborane is increased when the mixed alkyldiboranes are contacted with excess diborane; the maximum enrichment is dependent on the temperature and pressure used. The proportion of monoalkyldiborane increases with increasing diborane pressure and decreasing temperature. For example, the composition of ethyldiborane and diborane in terms of an alkylation index, the number of alkyl groups for each diborane, is shown in Table I.

TABLE I

| Alkylation Index | 3.2 | 2.8 | 2.3 | 1.9 | 1.5 |
|---|---|---|---|---|---|
| | Pressure (p.s.i.a.) | | | | |
| Temperature (° C): | | | | | |
| −25 | 6.4 | 7.5 | 9.5 | 14.2 | 55.0 |
| 0 | 8.4 | 9.5 | 12.7 | 22.4 | 92.5 |
| 25 | 11.7 | 14.5 | 18.5 | 34.1 | |

The enrichment is substantially completed in 3 to 4 hours when gaseous diborane and liquid alkyldiboranes are contacted in closed autoclaves, or in even shorter times if the reactants are vigorously agitated. If the temperature and pressure are too high, e.g. above about 75° C. and about 100 p.s.i.a., undesirable diborane pyrolysis reactions occur.

The mixture enriched in monoalkyldiborane is then distilled to separate the monoalkyldiborane. To perform the distillation it is necessary to change the temperature and pressure conditions from those used in the enrichment reaction in a direction that tends to decrease the amount of monoalkyldiborane, i.e., either increase the temperature, reduce the pressure, or both. The rate at which the decrease in the amount of monoalkyldiborane occurs is sufficiently slow that separation may be accomplished by conventional distillation techniques, but it is preferred that the distillation be done as rapidly as possible.

The rate at which the amount of monoalkyldiborane is decreased is slower at low temperatures, and the decrease can be substantially eliminated by carrying out the enrichment reaction at ambient temperature, cooling and resultant mixture to a low temperature, e.g. −50° C., and distilling the mixture at low temperature under vacuum.

A preferred method is to carry out the enrichment reaction at superatmospheric pressure and ambient temperature, bleed off diborane to reduce the pressure to about atmospheric, and distill the mixture at atmospheric pressure. Although this method results in a somewhat lower yield of monoalkyldiborane than the low temperature vacuum distillation, it is more easily performed in simpler equipment and more easily adaptable to large scale production.

The overhead distillation product is monoalkyldiborane and diborane, which acts as a non-condensible gas in the system. The monoalkyldiborane in the overhead product is separated by condensing it from the diborane. The diborane may be recycled and reused to treat further mixed alkyldiboranes.

The following example is illustrative of the method of preparing and separating monoalkyldiboranes. 546 cc. of diborane and 51.1 cc. of mixed diethyldiboranes were contacted for 20 minutes at 25° C. and atmospheric pressure. The entire mixture was distilled through a (1) −85° C. condenser, a (2) −138° C. condenser and (3) −196° C. condenser. The mixed diethyldiboranes and any more highly alkylated diboranes were condensed in condenser (1), monoethyldiborane in condenser (2) and diborane in condenser (3). 24.3 cc. of monoethyldiborane was recovered. The ethyldiboranes in condenser (1) were again treated with diborane and the mixture distilled as before. This cycle was repeated four times and a total of 45.2 cc. of monoethyl diborane was recovered. The residual 31.5 cc. of mixed ethyldiboranes was again treated with diborane for 16 hours, and 9.9 cc. more monoethyldiborane was separated.

The monoalkyldiboranes disproportionate to form exclusively sym-dialkyldiborane and diborane. This disproportion proceeds in the gas, liquid or mixed phases, but most rapidly in the liquid phase. Table II shows the amount of disproportionation obtained when monoethyldiborane was maintained at 25° C. for 1 hour.

TABLE II

*Disproportionation of Monoethyldiborane 1 Hour at 25° C.*

| Phase | Reactor Vol, cc. | Reactant $C_2H_5 \cdot B_2H_6$ mmol. | Products, mmol. | | | Percent Disproportionation |
|---|---|---|---|---|---|---|
| | | | $B_2H_6$ | $(C_2H_5)_2B_2H_4$ | $C_2H_5B_2H_5$ | |
| Gas | 330 | 2.25 | 0.32 | 0.31 | 1.63 | 28 |
| Mixed | 10 | 0.915 | 0.20 | 0.18 | 0.51 | 44 |
| Liquid | 1 | 1.48 | 0.34 | 0.32 | 0.81 | 45 |

The disproportionation reaction is an equilibrium reaction which results in a mixture of monoalkyldiborane, diborane and product sym-dialkyldiborane. This mixture is separated by distillation or stripping to remove the more volatile diborane and monoalkyldiborane from the product. For example, monoethyldiborane has a vapor pressure of 7 mm. at −78° C. and sym-diethyldiborane has a vapor pressure of only 36 mm. at 0° C. The monoalkyldiborane may then be separated from diborane by partial condensation and then be further disproportionated.

The disproportionation may be carried out at superatmospheric or subatmospheric pressures, and at any temperature below which diborane pyrolysis occurs, i.e. about 75° C. at superatmospheric pressure and 150° C. at subatmospheric pressures. The equilibrium constant for the reaction

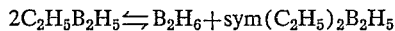
$$2C_2H_5B_2H_5 \rightleftarrows B_2H_6 + \text{sym}(C_2H_5)_2B_2H_5$$

at 25° C. is $K_p=.039$ in the gas phase and $K_p=0.169$ in the liquid phase.

The following example is illustrative of the disproportionation of monoalkyldiboranes. A sample of monoethyldiborane was vacuum distilled from mixed ethyldiboranes and condensed at −85° C. At this temperature the rate of the disproportionation reaction is negligible, so pure monoethyldiborane is attained. 2.5 mmoles of monoethyldiborane was transferred to a bulb and expanded entirely to the vapor phase at 25° C. and about 120 mm. pressure. After 15 minutes the material in the bulb was vacuum fractionated and there was recovered 0.35 mmol of sym-diethyldiborane, 0.35 mmol of diborane, and 1.85 mmol of monoethyldiborane. In another reaction, 0.915 mmol of monoethyldiborane was charged to a 10 cc. reaction bulb and maintained at 25° C. and about atmospheric pressure for 1 hour. Both liquid and vapor phase monoethyldiborane were present in the reactor. The reaction mixture was vacuum fractionated and there was recovered 0.18 mmol of sym-diethyldiborane, 0.20 mmol of diborane, and 0.51 mmol of undisproportionated monoethyldiborane.

The sym-dialkyldiborane exhibits a unique infra-red spectrum. The unsym-dialkyldiborane shows strong absorption peaks at 3.9µ, 4.1µ, and another absorption peak at 8.6µ. The sym-dialkyldiboranes exhibit only one peak at 3.9µ; there is no absorption peak at 4.1µ or 8.6µ. The structure was also confirmed by chemical reaction; the hydrolysis of sym-dialkyldiboranes produced exclusively boronic acids, $RB(OH)_2$. The sym-dialkyldiboranes are unexpectedly stable. For example, sym-diethyldiborane did not disproportionate, pyrolyze, or self react in any other manner in 24 hours at 25° C. in the gas phase.

According to the provisions of the patent statutes, we have explained the principle and mode of practicing our invention, having described what we now consider to be its best embodiments. However, we desire to have it understood that within the scope of the appended claims, the invention may be practiced otherwise than as specifically described.

We claim:

1. A method of preparing sym-dialkyldiboranes that comprises the steps of reacting excess diborane and mixed alkyldiboranes at a temperature below about 75° C. and a pressure below about 100 p.s.i.a., separating essentially pure monoalkyldiborane from the resultant reaction mixture, disproportionating the said monoalkyldiborane, and recovering essentially pure sym-dialkyldiborane.

2. A method according to claim 1 in which the diborane and mixed alkyldiborane are reacted at superatmospheric pressure.

3. A method according to claim 1 in which the alkyldiboranes are ethyldiboranes.

4. A method of preparing sym-dialkyldiboranes that comprises the steps of disproportionating essentially pure monoalkyldiborane, and separating essentially pure sym-dialkyldiborane from the resultant reaction mixture.

5. A method according to claim 4 in which the alkyldiboranes are ethyldiboranes.

6. A method of preparing sym-diethyldiboranes that comprise the steps of reacting excess diborane and mixed ethyldiborane at a temperature below about 75° C. and a pressure below about 100 p.s.i.a., distilling the resultant reaction mixture at about atmospheric pressure, recovering essentially pure monoethyldiborane from the distillate, disproportionating the said monoethyldiborane, distilling the resultant reaction mixture at about atmospheric pressure, and recovering the essentially pure sym-diethyldiborane produced.

References Cited in the file of this patent

UNITED STATES PATENTS 2,968,533    Lichtenwalter _____ Jan. 17, 1961